United States Patent [19]

Wiegardt, Jr.

[11] 3,996,895
[45] Dec. 14, 1976

[54] SYSTEM FOR GROWING CONCENTRATED POPULATIONS OF OYSTERS AND RELATED SHELLFISH

[76] Inventor: John L. Wiegardt, Jr., P.O. Box 2, Nahcotta, Wash. 98637

[22] Filed: July 14, 1975

[21] Appl. No.: 595,546

Related U.S. Application Data

[62] Division of Ser. No. 398,088, Sept. 17, 1973, Pat. No. 3,901,190.

[52] U.S. Cl. .................................. 119/4
[51] Int. Cl.² .............................. A01K 61/00
[58] Field of Search ................... 119/4, 3, 2

[56] References Cited
UNITED STATES PATENTS

| | | | |
|---|---|---|---|
| 1,660,259 | 2/1928 | Elsworth | 119/4 |
| 2,989,945 | 6/1961 | Ford | 119/4 |
| 3,650,244 | 3/1972 | Fordham | 119/4 |

*Primary Examiner*—Hugh R. Chamblee
*Attorney, Agent, or Firm*—Seed, Berry, Vernon & Baynham

[57] ABSTRACT

A system is described for holding dense population of filter-feeding organisms, such as free, or "cultchless" oysters and hardshell clams in a configuration opposed to currents of nutrient-laden sea water. The system consists of means that both channel currents, or water flows developed by pumping, gravity flow, or tidal forces and hold the populations in opposition to these currents. A distributing flow of water is achieved throughout the populations contained in the system so that individual members of the population may filter at optimum rates, with waste products of their filtering activities being removed by the current.

The system is capable of taking tiny hatchery-derived seed and growing them to commercial maturity in a series of stages designed to optimize handling and feeding requirements at the various stages. At the stages where the organisms are approaching commercial maturity and require a greater current flow and more nutrients, the system is capable of developing an increased level of efficiency in regard to the utilization of resources of current flow and nutrients. At its most efficient level, the system contemplates harvest of a phytoplankton resource of any estuarial area at optimum sustainable levels.

6 Claims, 9 Drawing Figures

SYSTEM FOR GROWING CONCENTRATED POPULATIONS OF OYSTERS AND RELATED SHELLFISH

This is a division of application Ser No. 398,088, filed Sept. 17, 1973 now U.S. Pat No. 3,901,190.

BACKGROUND OF THE INVENTION

1. Field of the Invention

This invention relates to a system for the artificial growing of dense populations of hatchery-derived filter-feeding shellfish such as free oysters and clams, with means provided for holding these populations in currents of nutrient-laden water. These means involve a flume system for growing the seed from hatchery sizes to intermediate sizes, with a special case for growing hardshell clams toward maturity in a flume, or "spillway" system. As the seed grows toward maturity, their requirements for current and for nutrients increase. A system is developed to provide these requirements. In this latter system, a progression of structures is utilized, beginning with a basic raft structure and adding channeling extensions to this primary structure. Each addition to the primary structure is designed to increase the efficiency of the system in utilizing a basic current and phytoplankton resource.

The system is designed to operate wherever there are currents and phytoplankton resources available. The system can be designed to be expanded to the limits of these resources.

2. Prior Art Relating to the Disclosure

Oysters, in their natural state, reproduce by spawning free swimming larvae that diffuse into the water medium. After a time for development, usually several weeks in duration, the larvae attach to suitable materials, usually clean, hard objects such as rocks and oyster shells. The natural home of the oyster is thus usually an oyster reef where oysters continually attach themselves to the shells of their predecessors, or a rocky beach or ledge. In these areas, the same currents that carry the oyster larvae carry the plankton to the attached oyster from which its food is derived.

The reproductive cycle of the oyster has been used to advantage by man by placing "cultch" materials — shells, rocks, sticks etcetera on which the oyster larvae attach, and then cultivating the resulting seed. One of the earliest methods of this type cultivation was to plant the cultch with seed attached on suitable "bottom" areas of estuaries in populations dense enough to permit efficient care and harvesting. Using this type of culture seed must be both cheap and plentiful as losses in the growing population are high due to the actions of predators and silting. Further, the "bottom areas" are not the natural home for the oyster and feeding conditions are usually not as good as those in natural reefs and rocks where tide flows and currents are swifter. In the areas where oysters reproduce naturally, however, the success of the setting often results in overcrowding in the oyster population, both in terms of space and food.

To overcome the problems generated both by "natural" and bottom culture and to ensure better seed survival and oyster growth, more advanced types of cultures, utilizing various means to suspend the oyster off the bottom have been developed. These means include trays to hold the oysters, and include also stick or shells with seed attached. When shells are used they are generally spaced out on wires or ropes.

Recent developments in hatchery techniques have made possible the production of adequate supplies of oyster and clam seed for commercial operation regardless of natural sets. One of the results of hatchery technology has been the development of "cultchless" or "free" oyster seed where oyster seed is produced that is not attached to cultch. A method and apparatus for growing free oyster seed is described in U.S. Pat No. 3,517,648, wherein water containing nutrients is pumped continuously through the seed population carrying food to and detritus from the seed.

The major problem with the use of free seed has been to take it through from the tiny hatchery-produced stage to a size and condition where it has commercial value. Present hatchery technology limits the size to which the seed can be grown feasibly because of the costs involved in the production of feed for the seed.

The single oyster seed, while ideal from the standpoint of hatchery production, is virtually helpless in the natural sea bed environment of conventional bottom culture. Without its cultch as a platform and an anchor, the oyster falls easy victim to predator, to minor currents, and to siltation. Culture of the single oyster demands a nursery stage where the seed oyster can grow under protected conditions to a size where it can survive in efficient numbers in nature. Because space requirements for seed populations increase with the growth of the individual members of the population, economy demands that nursery techniques be devised which can grow the population at a level of concentration above that of a single layer. Unless such means can be found, the cost for providing space for the expanding populations to usable sizes makes such nursery operations prohibitive for, at least, the species of oyster experimented with by the applicant, the *Crassostrea gigas*, or Pacific oyster.

SUMMARY OF THE INVENTION

Phytoplankton stand at the base of the food chain of the sea, in the same manner that plants are the basis for these chains of life on land. Both plant and phytoplankton are converters of the primary energy of sunlight into forms that can be utilized by other organic systems. They accomplish this conversion by means of photosynthesis. Phytoplankton, inasmuch as they are dependent upon sunlight, tend to live in the regions of the sea where sunlight penetrates, and are distributed through the water medium to the depth of this penetration.

The currents that move the sea-water medium are based upon the forces of wind and tides, and upon the massive circulation of the global seas that is engendered by the effects of the sun, moon and earth's spin. "Local" currents in a water body may be developed by pumping systems. These currents continuously turn over the seas, bringing nutrients from its depths, mixing these nutrients with those carried in from the rivers to the continents, stirring in oxygen and other life-support elements, etc. This continuous stirring and circulating, under the influence of the sun's light and warmth, provides the matrix for the continuous regeneration of the phytoplankton resource.

Currents that circulate the sea-water medium carry with them the phytoplankton populations suspended therein. The phytoplankton are moved by the same forces that generate currents.

In the system of this invention, the forces that produce currents in the sea-water are utilized by channeling them into flows that oppose populations of filter-feeding organisms. This channeled current flow becomes the basis for a distributing flow among the single members of the populations. In this flow that is so distributed the phytoplankton carried in suspension are utilized by the filtering organisms making up the population.

The system of the invention thus utilizes the forces of currents to create a flow that presents food and life-support elements to the concentrated populations of the system, thereby allowing the individual members of the populations to feed at optimum rates. The same flow flushes away wastes, removing them from the vicinity of the concentrated populations. In this system, the variables of: (1) current force; (2) phytoplankton and life-support elements; and (3) filter-feeding populations are assembled within a set of channeling structures. These channeling structures perform the dual role of: (1) holding the populations in opposition to the channeled flow; and (2) channeling the flow into a proper configuration so as to oppose the population.

The individual filter-feeding organism extracts its food and life-support materials from the sea-water medium by forcing water through its gill membranes where such material are caught on particles of mucous formed by the organism. The means for forcing water through the membranes are its cilia which beat the water into motion. With each beat of the cilia an amount of water is put in motion and is immediately replaced with an equal amount at the point of displacement. The beating of the cilia sets up a continuous current that moves nutrient-laden waters toward the gill membranes. The current continues for as long as the cilia beats. As the mucous particles entrap food and particulate material, a set of secondary cilia move the food and material toward the mouth of the organism. There, the food is ingested and the particulate material, bound in mucous, is rejected. It is essential that the particulate material, as well as the wastes of metabolic activities, be removed from the vicinity of the organism. In nature, currents remove these materials. In the system described currents are developed to provide the same function.

The different filter-feeding organisms carry out their function of channeling water into their filtering apparatus by various means. The oyster develops its "major channels" by allowing its shell to gape slightly, thereby exposing an extensive gill structure. The clam has a double siphon in its neck, one for carrying water down the neck and onto a gill structure held in its body, the other discharging the filtered water. Because the invention deals with the extension of the relationship between current, channeling structures, and filtering mechanism it is important to note the operation of these factors at the level of the individual organism. The efficiencies claimed for our system are based upon the same principles employed by the organism in its structure and actions.

As the filter-feeding organism carries out its filtering activities, it grows to maturity. As it grows, its ability to filter and its requirements for nutrients increase. It appears that the filtering rate for the oyster, regardless of its size or state of maturity, is in the ratio of 1 part oyster meat to 10,000 parts of water of equal displacement volume per 24 hour day. The establishment of this ratio, which may vary with temperature and available nutrients, enables prediction of the capacity for any given current flow to support a population utilizing the system of the invention.

In nature, populations of filter-feeding organisms tend to concentrate in the areas where tidal currents cause the free-swimming larvae to congregate and where there is a suitable bottom or cultch for the larvae to attach. Thus, in nature, the organisms are accustomed to both crowded conditions and to competition for the available food resources. For these reasons, they are ideally suited for adaptation to the concentrated population of the system of the invention.

In the attempt to devise nursery techniques for growing hatchery-derived oyster and clam seed, a relationship was established between concentrated populations of shellfish and currents of water. If the population of filter-feeding organisms is held in opposition to a channeled current of water so as to fill the dimensions of the channel, a distributing flow will result so that a supply of nutrient-laden water will be carried to the individual members of the population. From this discovery, it followed that a balance could be arrived at for any system between the distributing current force, the supply of nutrient materials carried therein, and the filtering population positioned in opposition to the flow. Such balancing allows the individual members of the population to operate at maximum levels of efficiency in developing bodily structure and desirable shell configurations.

In applying this principle of opposition to the development of systems based upon it, it became increasingly apparent that the same factors that apply to a single container that develops the distributing flow as it channels water against an opposing population of organisms would apply to the sytems of containers. Such container systems could balance current forces against the opposition of populations, thereby developing the distributing flow throughout the system. Further, in the same manner that a single container may fill the dimensions of a channel that brings a current of water to the container, thereby making all of that current available to a filtering population in the container, a set of multiple containers could also fill a channel to create a much larger scale system of opposition in which populations of organisms of approximately equal mass and density could be placed in opposition to very substantial currents.

The invention, therefore, consists of means for channeling currents of water to bring these currents against populations of filter-feeding organisms, thereby creating the distributing water flows. All of the channeling means are aimed at one objective—to enable the individual filter-feeding organisms of the population held in the system to utilize the phytoplankton resource at optimum levels.

In the system, the harvest of the phytoplankton resource is accomplished while the populations are held at optimum concentrations for that harvest in places where handling and maintenance operations can be most efficient and without interference with the basic production of the phytoplankton resource. This system is in marked contrast to holding dense populations of filter-feeding organisms in areas where the phytoplankton is produced—here, the presence of too many organisms can have the effect of holding down phytoplankton production.

These channeling means or structures of this invention must provide the dual function of holding the populations and of channeling the currents. The basic function of confining the population while developing the flow of water is accomplished by the use of screened containers which retain the population while permitting the passage of nutrient-laden water therethrough. The population is further confined between solid portions of the container that also serve to channel the current flow. The individual container becomes a channeling structure through which the current flows through the population contained therein having means for retaining the populations in the flow so created. Because the distribution of filter-feeding organisms in these containers is always influenced by gravity, this distribution will tend to occur horizontally across the surface of any container in which a population is placed. The only time when such distribution will not be horizontal is when the force of the current tends to displace a portion of the population out of this plane. As a practical matter then, the easiest way to develop an opposing current flow through a dense population is to change the direction of the current from its natural horizontal flow to an "upwelling" or "downwelling" direction through the width of the population. Such changes in the direction of the current may be readily accomplished in all cases except where the changed flow must overcome the force of gravity. In this instance the water must be mechanically moved to overcome the gravitational forces. Changing the direction of current into an "off-horizontal" configuration is utilized throughout the systems described with the exception of the screen-retained populations in a flume as noted above.

A series of containers may be installed so that, as a whole, they intercept a larger amount of current than can be intercepted by the individual container. This incremental effect may be illustrated by incorporating "grandstand" or "venetian blind" column designs into a raft made up of several rows of such columns. The raft is anchored to a pivot point in the tide flow so that it always faces into the direction of tide flow which is itself a current flowing in the natural channel formed between the sea-bed and the sea-surface. Opposition to the current flow is thus developed as the raft is held against the current by its anchor and the potential for the distributing flow is thereby created. By the addition of a filter-feeding population in each of the containers, the potential so created is utilized.

The potential for the distributing flow may be enhanced by the addition of structural means to retain the current in its opposing configuration at the face of the population, keeping it from escaping in lateral directions around the raft. Such structural means may include devices that extend the outer dimensions of the raft in such a way as to help to retain the current.

The outer dimensions of the basic raft structure may be extended for some distance from the raft in the direction of the current flow. In addition, venturi-type extensions may be extended rearward from this structure. These extensions may also include those originating at the sides and the bottom of the opposing structure. The extensions serve to "funnel" the current into the raft structure holding the series of containers. Pressures are created across the face of the raft structure that increase the potential for more even and efficient distribution of the current through the populations, and for a greater utilization of the resources of the current.

The raft structure plus extensions may be further modified so that all of an available current flow is directed through the structures and into position against the filtering populations, thereby making available for the use of the filtering populations all of the potential energies of the current flow and phytoplankton resource.

The system, in its broadest sense thus comprises: (1) means for developing a current of nutrient-laden water up to the limit of the resources available for producing that current for distribution through dense populations of filter-feeding organisms (2) container means holding a concentrated population of shellfish in opposition to the flow of nutrient-laden water having side walls parallel to the flow of the nutrient-laden water and a configuration enclosing the flow to maintain opposition to the water flow by the organisms throughout the population contained therein so as to evenly distribute the nutrient-laden water through the population, and (3) means to develop sufficient water pressure to force the nutrient-laden water through the conentrated populations in the container. The channeled current of the nutrient-laden water that are distributed through the dense populations of shellfish may be developed from a number of sources, including gravity, pumping, or tide flow, using, if desired, by-product water flows of other systems such as cooling water from thermal or nuclear power plants. Oysters and clams can be used as filtering agents with the system of this invention to clean up algae and plankton populations in water passing through the system.

The objects of this invention include; (1) developing for any given area of seawater medium a system for growing quantities of edible shellfish up to the limits of the currents that circulate the seawater medium and the phytoplankton resource carried in these currents; (2) providing a system of shellfish culture that has a greater degree of control over both the shellfish organism and its environment through the various stages of the life cycle of the organism than can be achieved under present culture systems; (3) providing a system utilizing the combination of the potential energies of circulating water containing the plankton resource and concentrated populations of filter-feeding organisms to filter such water flowing by them for the purpose of converting the plankton to food energy for man; (4) providing a system for growing concentrated populations of shellfish capable of harvesting plankton resources at optimum levels of efficiency; (5) providing systems for growing concentrated populations of filter-feeding organisms utilizing induced current flow and capable of developing suitable current flow to grow populations (with desirable shell configurations) both uniformly and in very high densities; (6) providing a flume system holding a series of trays having foraminous bottom walls on which the free oyster or clam seed rests, water being forced upwardly through the population in the trays or through the population confined between adjustable screens; (7) providing a raft structure holding a dense population of the free seed, the raft designed to be anchored in a area of tide flow wherein nutrient-laden water flows in opposition to the population contained in trays feed them and to carry away the detritus generated; (8) providing a raft structure including a series of trays with foraminous top and bottom walls held in a framework placing the leading edge of each tray in the series below the following edge of the tray above it; and where means are employed to increase the flow through the tray-held populations (9) providing a system holding a dense population of filter-feeding organisms positioned across an area of an estuary to cause the tide flow alternately entering and leaving the artificial or natural estuary area to be forced through the system; (10) providing a system holding a dense population of filter-feeding organisms positioned across either the intake or discharge of the pumping systems so that all of the water entering or leaving the system will flow through the filtering population held in the system.

DESCRIPTION OF THE PREFERRED EMBODIMENTS

Both the individual filter-feeding organisms, with their biological adaptability and physiological characteristics, and the requirements of a population made up of these individuals must be considered in the design of a mass culture system. Thus, the container in such a system must be open to the flow of nutrient-laden water. It must also hold the dense population of filter-feeding organisms in a configuration which opposes the flow of the nutrient-laden water. Further, opposition to the flow of the water by the population must be maintained through the dimensions of the container that parallel the water flow. When the dense population of filter-feeding organisms is held in a container so that the nutrient-laden water flows through the population, a distributing or diffusing flow may develop in any container configuration ranging from vertical to horizontal. Because the force of gravity tends to distribute the surface of the population in a horizontal plane, however, the simplest way to create opposing flow is to do so in a container whose dimensions rise in a vertical plane through the height of the population held in it. When the container is in a current flow where gravitational pressures on the surface are not a factor, current flow may be deflected from its natural horizontal course into container configuration for development of the required opposition.

Figures 1, 2, 2A:
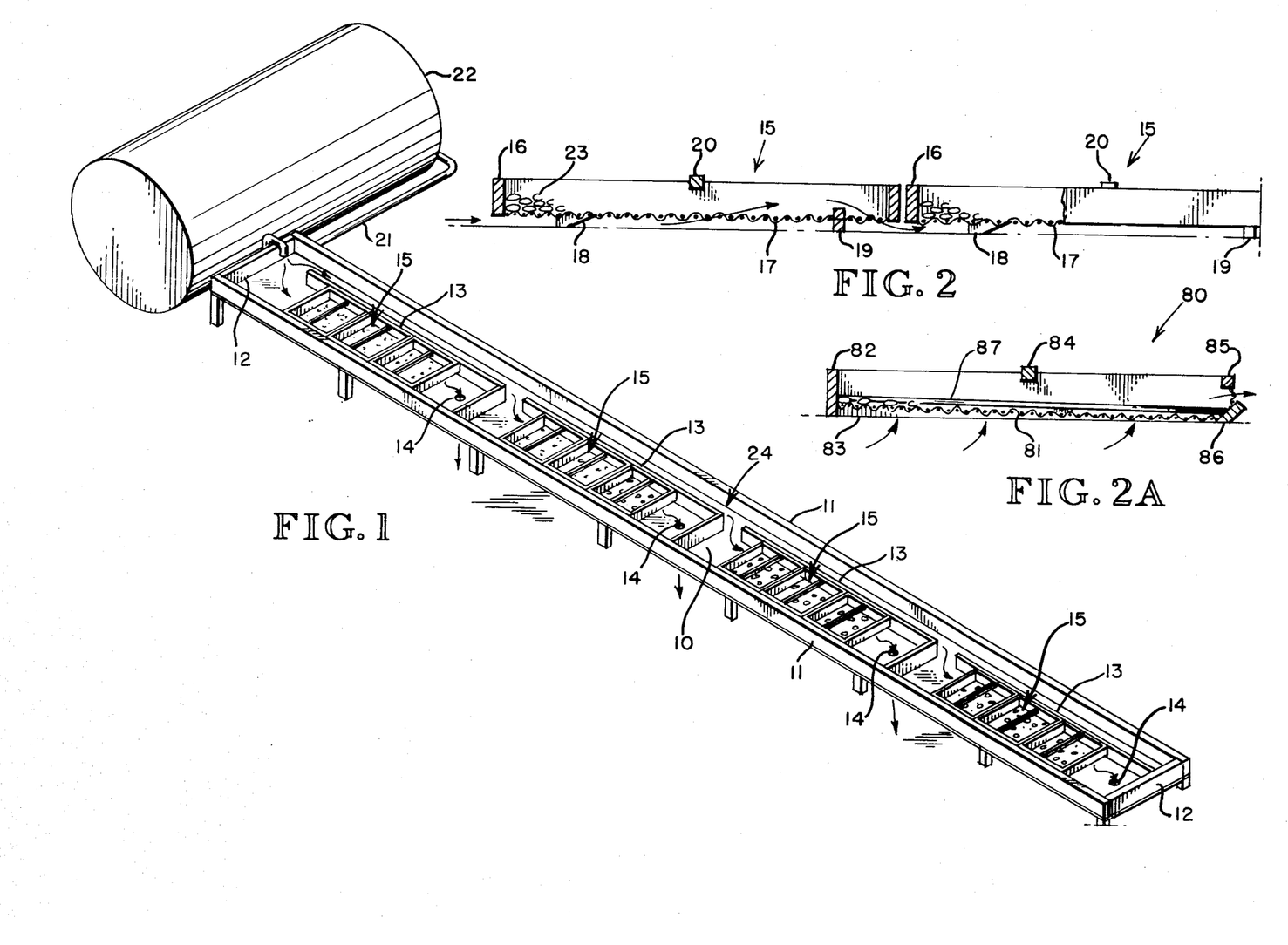
FIG. 1 is a perspective view of one means of artificially growing oyster and clam seed utilizing a flume having removable trays holding the seed, the trays positioned in the water flow down the flume and designed to force the water upwardly through the bottom of the trays through a dense population of filter-feeding organisms resting therein.
FIG. 2 is a partial vertical cross-sectional view through two of the abutting trays illustrating the water flow therethrough.
FIG. 2A is a vertical cross-sectional view illustrating an alternate tray design.

Referring to FIG. 1 a flume system is illustrated in which filter-feeding organisms rest in a series of trays having foraminous bottom walls positioned in the path of water flow through the flume. The flume includes a bottom wall 10 sloping downwardly from the point of introduction of the water with upended sidewalls 11 and endwalls 12. The flume may be divided into sections at spaced intervals along the length thereof by separators 13. At the end of each of the section is a drain 14. Within each of the sections are positioned a series of trays adjacent one another in which the filter-feeding organisms rest.

FIG. 2 shows one tray designed in more detail. Each of the trays 15 include vertical sidewalls 16 and a foraminous bottom wall 17. At the forward end of each of the trays are legs 18 which space the bottom wall of the tray from the bottom wall 10 of the flume. Near the rear of each tray is a baffle 19 extending the full width of the tray. Preferably the baffle is positioned just forward of the rear sidewall of the tray and has a height less than the height of the sidewalls of the tray. Each of the trays may be provided with a handle 20 if desired.

An alternate tray design is illustrated by FIG. 2A. Each tray 80 includes three upended sidewalls 82 connected to a foraminous bottom wall 81. The rear sidewall 85 is also foraminous. Parallel legs 83 extend down the length of the sidewalls of the tray. The legs 83 preferably slope downwardly beginning at the front of the tray from about ½ to 1 inch giving a reverse slope to the bottom wall 81, thereby allowing nutrient-containing water to flow evenly to the population resting on the upper surface of the bottom wall 81. The trays may be provided with a handle 84 for removal and insertion of the tray in the flume. The lower portion 86 of the rear wall of the tray forms a support for the tray, extends the full width of the tray and is designed to act as a "water-stop" to force the water upwardly through the bottom wall of the tray. Preferably the rear wall portion 86 is sloped rearwardly at an angle approximately 45° to provide smooth flow of water through the tray. Longitudinally extending supports 87 secured to the bottom wall 81 and the front and rear side walls may be provided to aid in supporting the foraminous bottom wall 81. These supports should have sloped upper surfaces to prevent seed from resting on them.

When the trays are positioned in the path of water flow down the flume as illustrated in FIG. 1, water entering through conduit 21 from a nutrient-containing water supply 22 is directed into each of the sections where it flows beneath the first of the trays positioned therein until baffle 19 or rear wall 86 is encountered. Referring to FIG. 2 the baffle forces the water upwardly through the screen bottom wall of the tray over the top of baffle 19, down through the bottom wall to the rear of the baffle and to the next abutting tray.

With the tray design of FIG. 2A the trays must be spaced from each other a few inches to allow water exiting through the rear wall of one tray to turn below the next adjacent tray. Oyster or clam seed 23 resting in a dense population limited only by the height of trays and flume in each of the trays is thus provided with a continuous supply of nutrient-containing water. The water aids in carrying away the detritus generated by the seed. The number trays which can be positioned in sequence in each of the sectioned areas is dependent on the population of seed in each of the trays, the rate of flow of the water through the trays, the size of the trays and other variables. Rather than as shown, a separate water supply can be provided to the forward end of each of the sectioned areas containing trays instead of channeling the water down a side channel 24 as illustrated in FIG. 1, the water diverted to the forward end of each of the series of trays.

The water after passing over and through the series of trays containing the filter-feeding organisms drains through opening 14 in the bottom wall of the flume. The water supply may be taken from any appropriate source containing proper nutrients for the filter-feeding organsims.

Oyster and clam seed grown in the trays as described grow uniformly throughout the length and height of each tray. The upward flow of water containing nutrients through the dense population of seed supplies nutrients to all the organisms in the trays uniformly and permits optimum growth of the population.

The flume system illustrated in FIG. 1 may be stacked one above the other in a relatively small area to enable artificial growing of great numbers of oyster or clam seed to an intermediate size. The flume system is housed within a suitable enclosure to prevent direct sunlight on the free seed. Rather than the tray system shown clam seed may be grown by confining a population between retaining screens and positioning the screens in the water flow down the flume.

The rates at which the filter-feeding organisms filter the nutrients from the water appear to be a function of basic metabolism and the displacement of volume of the individual filter-feeder. Where a fixed rate of flow is maintained in the flume, the volume of filter-feeding organisms that can be supported in the flow remains relatively constant regardless of the size of the individual members of the populations. Preliminary experimentation with the flume system illustrated by FIG. 1 indicates that the ratio between the gallons of water required for a given population gallonage is in the range of 10,000 gallons of water to 1 gallon of filter-feeder meat per 24 hour day. Many variables affect this ratio, especially the ratio between gallons of water and the current and the pounds of plankton carried by them.

Figures 3, 4:
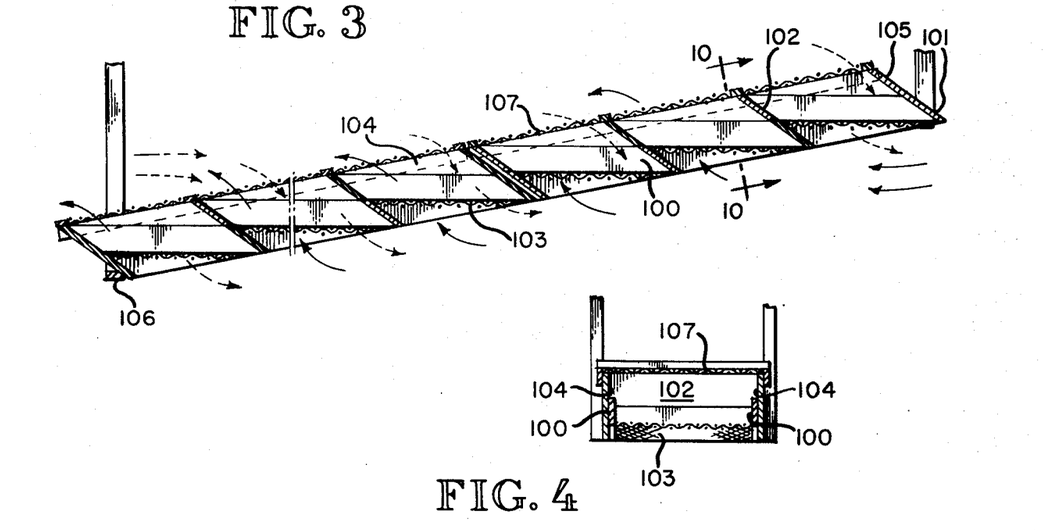
FIG. 3 is a vertical cross-sectional view of a culture system for anchor in an area of tide flow or in a fixed installation wherein the leading edges of each of the trays in the series holding the filter-feeding organisms are below the following edges of the preceding trays in grandstand or stairstep fashion.
FIG. 4 is a cross-sectional view through the system along section line 4—4 of FIG. 9.
Figure 5:
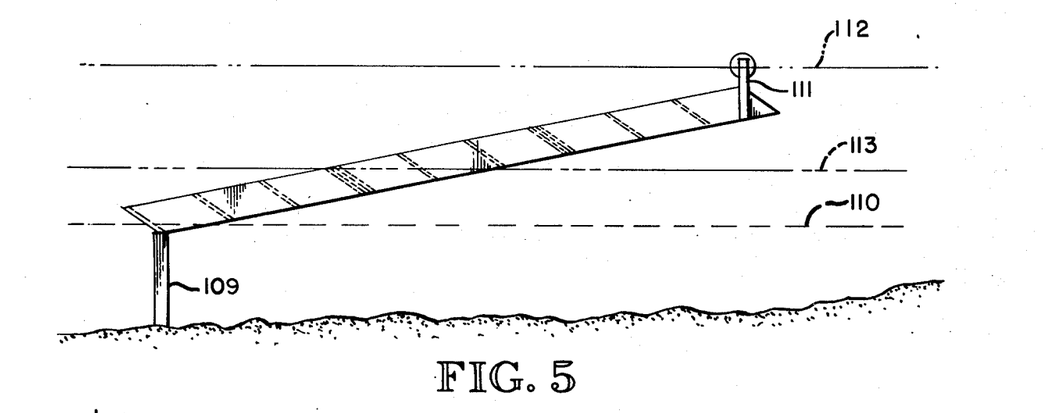
FIGS. 5 and 6 are schematic representations of a system utilizing the system of FIGS. 3 and 4 to cause the tide flow of water entering and leaving the estuary area to flow through the system.

FIG. 3 illustrates a system for culture of filter-feeding organisms includes a series of trays having front, rear and side walls and a screened bottom wall fastened together such that the leading edge of each tray is below the following edge of the tray above it relative to the direction of incoming current flow through the bottom wall to create an upwelling of nutrient-laden water through the trays. The direction of the current relative to the structure may be reversed, producing a downwelling, evenly-distributed flow through the trays as well. such a stairstep or grandstand system, illustrated in FIG. 3, or a venetian blind system, as FIG. 8, has a number of distinct advantages for culture of filter feeding organisms. These advantages include:

1. Adaptability of this design to systems ranging from rafts to fixed systems where the trays are positioned within a fixed set of channels;

2. A system where a separate nutrient-laden strata of water is delivered to each tray;

3. A system where the common surface between trays becomes the water deflector for the preceeding tray in the series, thereby developing the opposing flow through the entire series of trays;

4. A system where water flows through each of the trays without distortion of the major current entering and leaving the system;

5. A system where the trays are self-cleaning of detritus because of the forced water flow therethrough;

6. A system which is inexpensive to construct and adapted to mechanized handling;

7. A system wherein each tray takes a uniform "bite" out of a column of water flowing in either direction along an axis essentially parallel to the water level;

8. A system where, in a fixed installation, alternate upwelling and downwelling currents are created through alternate phases of the tide cycle;

9. A system where, in fixed installations as a part of the pumping system, continuous, one-way flows are created at either intake or discharge.

Referring to FIG. 3, a series of trays, each having sidewalls 100, a front wall 101, and a rear wall 102, are fastened together in "stairstep" or grandstand fashion. The front and rear walls of each tray may be disposed at a negative angle of from 35°–45° from the horizontal relative to the incoming tide flow, although they may be disposed up to right angles to the horizontal. The trays may be fastened together by pins, plates overlapping the intersection of the trays or by a common side board 104 as illustrated by FIG. 3. The front wall 101 of the first tray of a series of trays and the rear wall 102 of the last tray of the series are preferably extended as illustrated in FIG. 3 to provide surfaces 105 and 106 to complete the baffling of the tray complex for directing water flow through the respective trays. The top wall or lid of the trays may be a single screen 107 fastened to the side boards 104 and upper walls of each of the trays. The size of the trays and angle of the front and rear walls of the trays can be varied according to circumstances encountered, considering such factors as tidal energy, population density, wind and weather conditions, etc. Exemplary dimensions of each tray are, for example, 7 feet long, 4 feet wide, and 6 to 12 inches deep. Smaller trays of the type illustrated in FIG. 1 may be inserted in the larger trays of the complex for easier handling and maintenance.

Figures 7, 8:
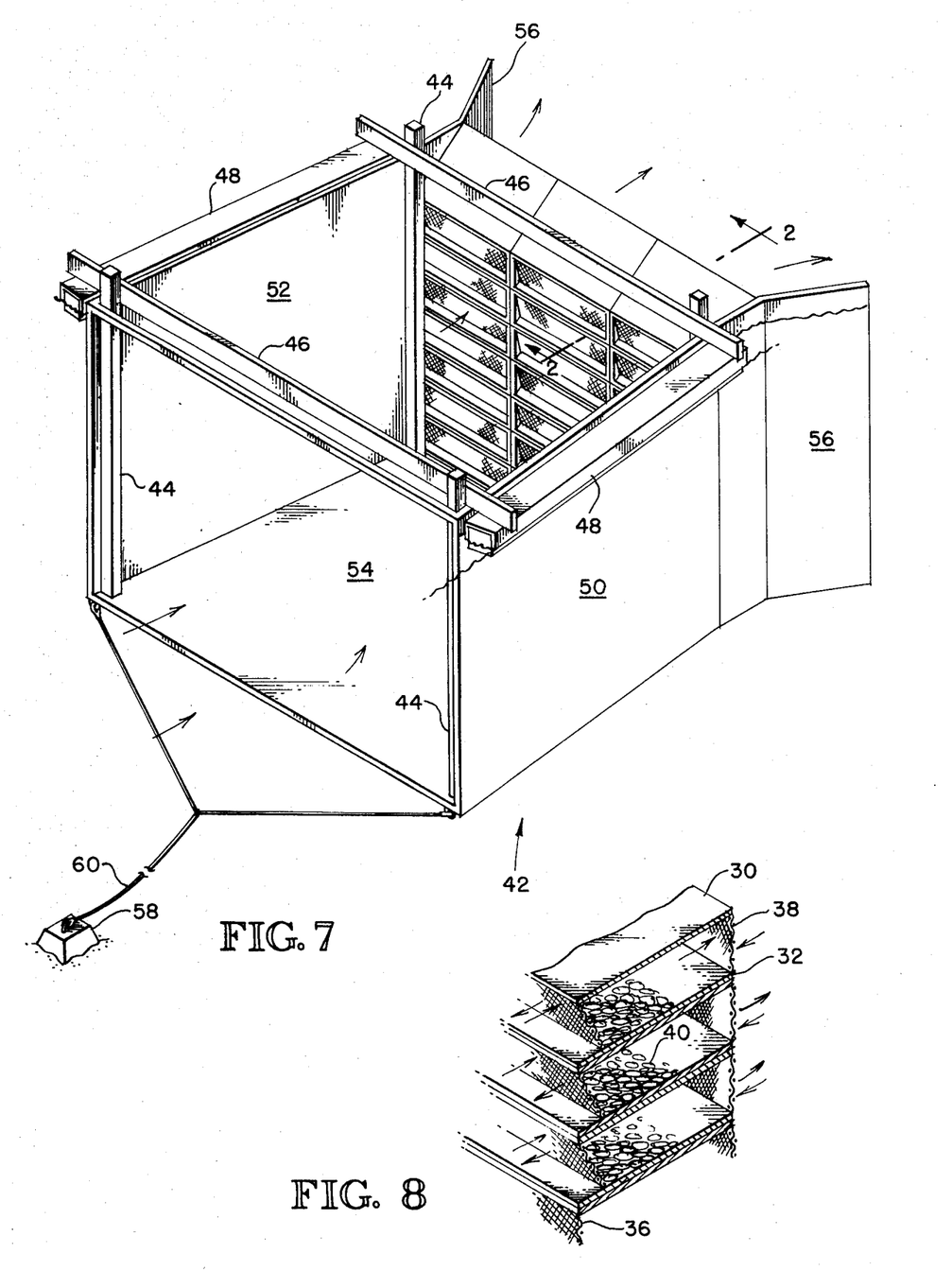
FIG. 7 is a perspective view of a system pivotally anchored in an area of tide flow, the containers for the filter-feeding organisms stacked in a "venetian blind" manner.
FIG. 8 is a partial vertical cross-section of the containers of FIG. 7 along section line 7—7.

A variation of the stair-step or grandstand design is illustrated in FIGS. 8, the venetian blind concept. The grandstand design utilizes a horizontally descending column of trays with horizontal screen bottoms so that the populations of filter-feeding organisms may be held relatively level against the flow of the current. The Venetian blind concept, on the other hand, utilizes a vertically descending column of trays with the screens at angles to the horizontal. The individual trays include solid top walls 30, bottom walls 32 and side walls 34 with screened front and rear walls 36 and 38 at angles to the horizontal holding the filter-feeding population 40 therein.

A series of such trays may be grouped together as illustrated in FIG. 7 at the rear of a raft structure 42 anchored in an area of tide flow. The raft structure 42 includes vertical frame supports 44 at each of four corners joined by horizontal cross braces 46. Flotation means 48 such as polystryrene foam blocks are secured to the upper part of the raft structure. The raft includes solid side walls 50 and 52 and a solid bottom wall 54 to channel the nutrient-laden seawater through banks of trays of the design illustrated by FIGS. 7 and 8 or FIGS. 3 and 4 or modifications thereof. The side walls preferably diverge outwardly from the banks of trays to essentially funnel the current flow through the populations of filter-feeding organisms held in the trays. Outwardly diverging water deflectors 56 may be secured as illustrated by FIG. 7 to deflect water flow along the side walls of the raft outwardly and create a partial negative water pressure at the rear end of the tray complex to aid water flow through the tray complex and aid in positioning the raft in the tidal flow. The raft structure is anchored by suitable means, such as a cable 60 to means 58 at the bottom of the water body so that it is free to pivot and orient itself essentially perpendicular to the flow. The depth of the raft structure and tray complex should be sufficient to take advantage of the major surface currents of the particular water body generated by the incoming and outgoing tides.

Figure 6:
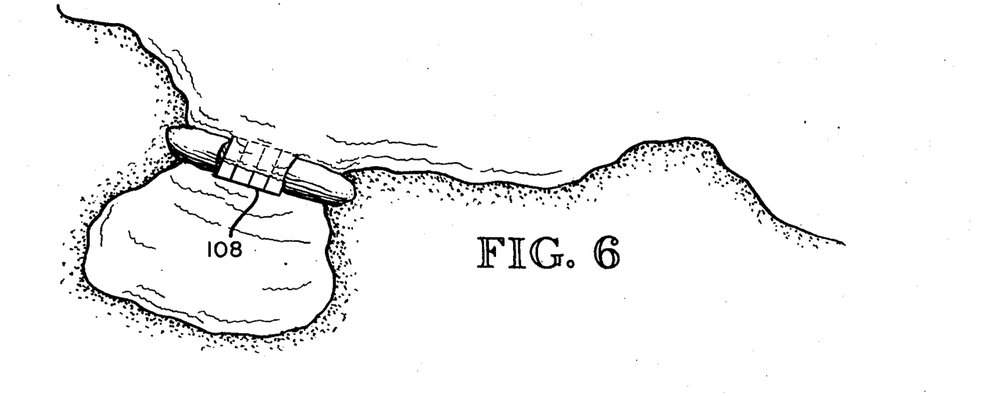

FIG. 6 illustrates use of a system constructed as a barrier to the entry of water to and from a natural or artificially created estuary, so that the tide flow must pass through the channeling structures and into opposition against populations in the tray structures. This system combines the food producing efficiencies of the estuary with the utilization of the energy of tide flow through the tray system to create a practical, large-scale means of mariculture. For the most efficient operation, the tray complex, either of the design of FIG. 3 or FIG. 8 or other suitable design, is constructed where estuarial areas are present on both sides of the complex or in an artificially created diked area where an inner pond is contained between low tide phases by the complex. This system may be also constructed at the intake or discharge of large scale pumping systems, where large one-directional current flows are created. When utilizing a system such as illustrated by FIG. 6, the system must be adjustable to the changing surface level of the tide. This may be done in two basic ways: (1) the column of trays with bottom and sides enclosed by fixed structures may be hinged at the bottom and held at the surface by floats to adjust for the changing height of the tide, and (2) dropping a barrier from above the high tide level to a level near mid-tide so that all of the waters of the higher tide stages flows through the channel beneath the barrier. In this instance, the columns of trays start at the barrier and descend to the bottom dimension of the channel. Care must be taken to avoid creation of destructive currents during low tide intervals. One such means is to construct a bottom structure which can withstand the stresses of strong currents, much as the spill-way systems of a dam. Another means is to hold the channel bottom far enough below the level of extreme low tide to avoid the creation of such stresses.

Referring to FIG. 6, the tray complex 108, consisting of a series of trays disposed in side to side relation of the type illustrated in FIGS. 3 or 8, or modifications thereof, is secured at its lower end to a solid barrier 109 extending upwardly from the bottom of the estuary to a level 110 just below the height of extreme low tide and at its upper end to an upper barrier 111 secured at its ends by suitable means to land adjacent the estuary. The upper barrier descends from or near the level 112 of high tide to a lower level 113 at or near an average tide level. The two barriers 109 and 111 cause the flow of water from incoming and outgoing tides to be directed through the tray complex. A series of such tray complexes within the channeling enclosure may be utilized to make maximum use of the nutrients contained in the water, thereby optimizing the harvest of the nutrient resource as illustrated. Such a complex is also useful in large-scale pumping systems where filtering populations will filter out the organic components of the intake water. An example of such pumping systems are the cooling systems for steam generators used in the production of electricity. In such large-scale pumping systems along coastlines, systems such as illustrated in FIGS. 6 and 7 can be placed so as to enclose the intake to the pump and extend from there in the direction of the incoming current far enough to hold as many lateral systems as desired. The water flowing into the intake of the pump through the filter-feeding organisms would be filtered free of the organic materials contained therein before entering the pumping system.

It is not the intent of this application to go into means for handling the dense populations of filter-feeding organisms grown in these structures and for maintaining the structures at the most efficient level. It is apparent, however, that the groupings of trays into columns and rows makes it possible to handle the trays and the populations in multiples. Further, the growth and development of fouling organisms make it desirable to expose the elements of the system to the air whenever possible in order to destroy these undesirable elements. Under these considerations, means for removing columns or rows of trays for handling on shore and replacing these units with others already loaded can be accomplished with cranes operating from shore or floating on the water, depending upon the size and location of the systems involved. The populations in the trays are also amenable to handling by pumping devices that operate below the water.

Generally it has been found that oyster seed obtained directly from a hatchery operation (generally about 1/10 inch in diameter) can be grown to any size desired, first in a flume system as in FIG. 1 and then matured in a raft or fixed system, with the timing of its removal from the flume system depending upon the availability of space in the further system and upon the degree to which space in the flume is taken up by the growing population. For example, under optimum temperature and nutrient conditions, the population of oysters doubles its space requirements every week, increasing in displacement volume by about 60%. As the seed grows from the sizes produced in the hatchery operation it is removed from the trays and screened to size then kept separated when replaced into trays. Seed can be removed from the flume at 1/4, 3/8, 1/2 inch diameter or larger sizes. The further systems described can be used to grow the seed to harvestable size, or to intermediate sizes from which it can be transferred to other methods of culture.

The embodiments of the invention in which a particular property or privilege is claimed are defined as follows:

1. A raft culture system utilizing the tidal flow of nutrient-laden sea water to furnish food to a concentrated population of filter-feeding organisms held in a plurality of trays within the raft, comprising:
 a support frame,
 a series of trays secured to the frame, each tray having parallel top and bottom walls joined together by side walls, and foraminous front and back walls, the first and succeeding trays stacked atop one another, and
 anchor means positioning the support frame and series of trays in an area of tidal flow with the top and bottom walls inclined with respect to the surface of the water and the front and back walls open to receive the natural horizontal tidal flow of nutrient-laden water throughout the width of the population confined within each of the trays, the tidal flow being directly upwardly through the trays for even distribution of the nutrients contained in the water.

2. The raft system of claim 1 including channeling side walls and a bottom wall extended in the direction of the tidal flow from the series of trays to channel the tidal flow through the trays.

3. The system of claim 1 wherein the anchor means anchors the raft system at the entrance of an estuary so that the water entering and leaving the estuary passes through the populations held in the trays of the raft system.

4. The system of claim 2 including side frame members securing the respective side walls of the series of trays together, and flotation means secured to the side walls for maintaining the upper series of trays at essentially water level.

5. The system of claim 2 including wherein the anchor means anchors the raft system, including the series of trays, in a fixed location at the entrance to an estuary so that there is an upwelling flow of water through each of the trays with the incoming tide and a down welling flow of water through each of the trays with the outgoing tide.

6. The raft system of claim 2 wherein the anchor means anchors the raft system, including the series of trays, in a fixed location at the inlet or discharge end of a large pumping system so that the water entering or leaving the pumping system passes through the populations held in the trays.

* * * * *